(12) United States Patent
Whitehouse

(10) Patent No.: US 8,090,393 B1
(45) Date of Patent: Jan. 3, 2012

(54) SYSTEM AND METHOD FOR COLLECTING AND ANALYZING MALICIOUS CODE SENT TO MOBILE DEVICES

(75) Inventor: Oliver Whitehouse, Sutton (GB)

(73) Assignee: Symantec Operating Corporation, Mountain View, CA (US)

( * ) Notice: Subject to any disclaimer, the term of this patent is extended or adjusted under 35 U.S.C. 154(b) by 1181 days.

(21) Appl. No.: 11/479,094

(22) Filed: Jun. 30, 2006

(51) Int. Cl.
*H04W 4/00* (2009.01)
*G06F 12/16* (2006.01)
*G06F 11/00* (2006.01)
*G06F 12/14* (2006.01)
*G08B 23/00* (2006.01)

(52) U.S. Cl. ............................. 455/466; 726/22; 726/24

(58) Field of Classification Search .................. 455/466, 455/403; 726/22, 24
See application file for complete search history.

(56) References Cited

U.S. PATENT DOCUMENTS

| | | | | |
|---|---|---|---|---|
| 5,233,642 | A * | 8/1993 | Renton | 455/405 |
| 6,765,881 | B1 * | 7/2004 | Rajakarunanayake | 370/256 |
| 7,043,757 | B2 * | 5/2006 | Hoefelmeyer et al. | 726/24 |
| 7,043,758 | B2 * | 5/2006 | Grupe | 726/24 |
| 7,073,172 | B2 * | 7/2006 | Chamberlain | 717/169 |
| 7,245,929 | B2 * | 7/2007 | Henderson et al. | 455/466 |
| 7,251,830 | B1 * | 7/2007 | Melchione | 726/24 |
| 7,281,269 | B1 * | 10/2007 | Sievers et al. | 726/24 |
| 7,289,762 | B2 * | 10/2007 | Vilkuna et al. | 455/2.01 |
| 7,302,706 | B1 * | 11/2007 | Hicks et al. | 726/24 |
| 7,370,360 | B2 * | 5/2008 | van der Made | 726/24 |
| 7,519,726 | B2 * | 4/2009 | Palliyil et al. | 709/232 |
| 7,523,487 | B2 * | 4/2009 | Muhlestein | 726/3 |
| 7,634,262 | B1 * | 12/2009 | Li | 455/419 |
| 2001/0005889 | A1 * | 6/2001 | Albrecht | 713/201 |
| 2002/0013910 | A1 * | 1/2002 | Edery et al. | 713/201 |
| 2002/0042886 | A1 * | 4/2002 | Lahti et al. | 713/201 |
| 2003/0095550 | A1 | 5/2003 | Lewis et al. | 370/392 |
| 2003/0191957 | A1 * | 10/2003 | Hypponen et al. | 713/200 |
| 2004/0131014 | A1 * | 7/2004 | Thompson et al. | 370/230 |
| 2004/0158741 | A1 * | 8/2004 | Schneider | 713/201 |
| 2004/0185883 | A1 * | 9/2004 | Rukman | 455/466 |
| 2005/0260993 | A1 * | 11/2005 | Lovell, Jr. | 455/445 |
| 2006/0005244 | A1 * | 1/2006 | Garbow et al. | 726/24 |
| 2006/0195701 | A1 | 8/2006 | Dew et al. | 713/188 |
| 2006/0259819 | A1 * | 11/2006 | Connor | 714/38 |
| 2007/0156579 | A1 * | 7/2007 | Manesh | 705/39 |

OTHER PUBLICATIONS

Trend Micro, "Security for Mobile Devices: Protecting and Preserving Productivity," Dec. 2005, pp. 1-15.

* cited by examiner

*Primary Examiner* — Lester Kincaid
*Assistant Examiner* — Nathan Mitchell
(74) *Attorney, Agent, or Firm* — Campbell Stephenson LLP

(57) ABSTRACT

Various methods and systems for collecting and analyzing mobile messages for malicious code are disclosed. In one embodiment, a method involves receiving a first message sent to a telephone number by a sender and determining whether the message contains malicious code. The first message is sent to the telephone number (e.g., a common short code), which is associated with a message analysis server, using a wireless messaging service such as EMS or MMS. The first message can be sent from a mobile communication device (e.g., by a user or by an application, such as an antivirus program, executing on the mobile communication device).

24 Claims, 4 Drawing Sheets

SYSTEM AND METHOD FOR COLLECTING AND ANALYZING MALICIOUS CODE SENT TO MOBILE DEVICES

FIELD OF THE INVENTION

This invention relates to mobile messaging and, more particularly, to analyzing mobile messages for malicious code.

DESCRIPTION OF THE RELATED ART

Mobile communication devices such as cell phones and personal digital assistants (PDAs) are becoming increasingly sophisticated. Unfortunately, as mobile technology has advanced, mobile communication devices have become more susceptible to viruses and other types of malicious code. At the same time, mobile communication devices lack the computing resources needed to implement full-service protection again malicious code. Because of the limited computing resources available on the mobile communication devices, full-service antivirus products may run so slowly or disruptively that users find such products unacceptable. As a result, many mobile antivirus products, which execute on mobile communication devices themselves, are stripped-down versions of antivirus products that are used on computer devices. For this reason, such antivirus products may not be able to adequately protect the mobile devices on which they are installed. Accordingly, new techniques are desired to detect and neutralize malicious code that may adversely affect a mobile communication device.

SUMMARY

Various embodiments of methods and systems for collecting and analyzing mobile messages for malicious code are disclosed. In one embodiment, a method involves receiving a first message sent to a telephone number by a sender and determining whether the message contains malicious code. The first message is sent to the telephone number (e.g., a common short code), which is associated with a message analysis server, using a wireless messaging service such as EMS or MMS. The first message can be sent from a mobile communication device (e.g., by a user or by an application, such as an antivirus program, executing on the mobile communication device).

A second message can subsequently be sent to the sender. The second message identifies whether the message comprises malicious code. The second message can also include instructions for manually removing the malicious code. Alternatively, the second message can include an executable file configured to remove the malicious code.

Another embodiment of a method involves receiving a first message sent by a mobile communication device and sending a second message to the mobile communication device. The second message indicates whether the first message contains malicious code.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
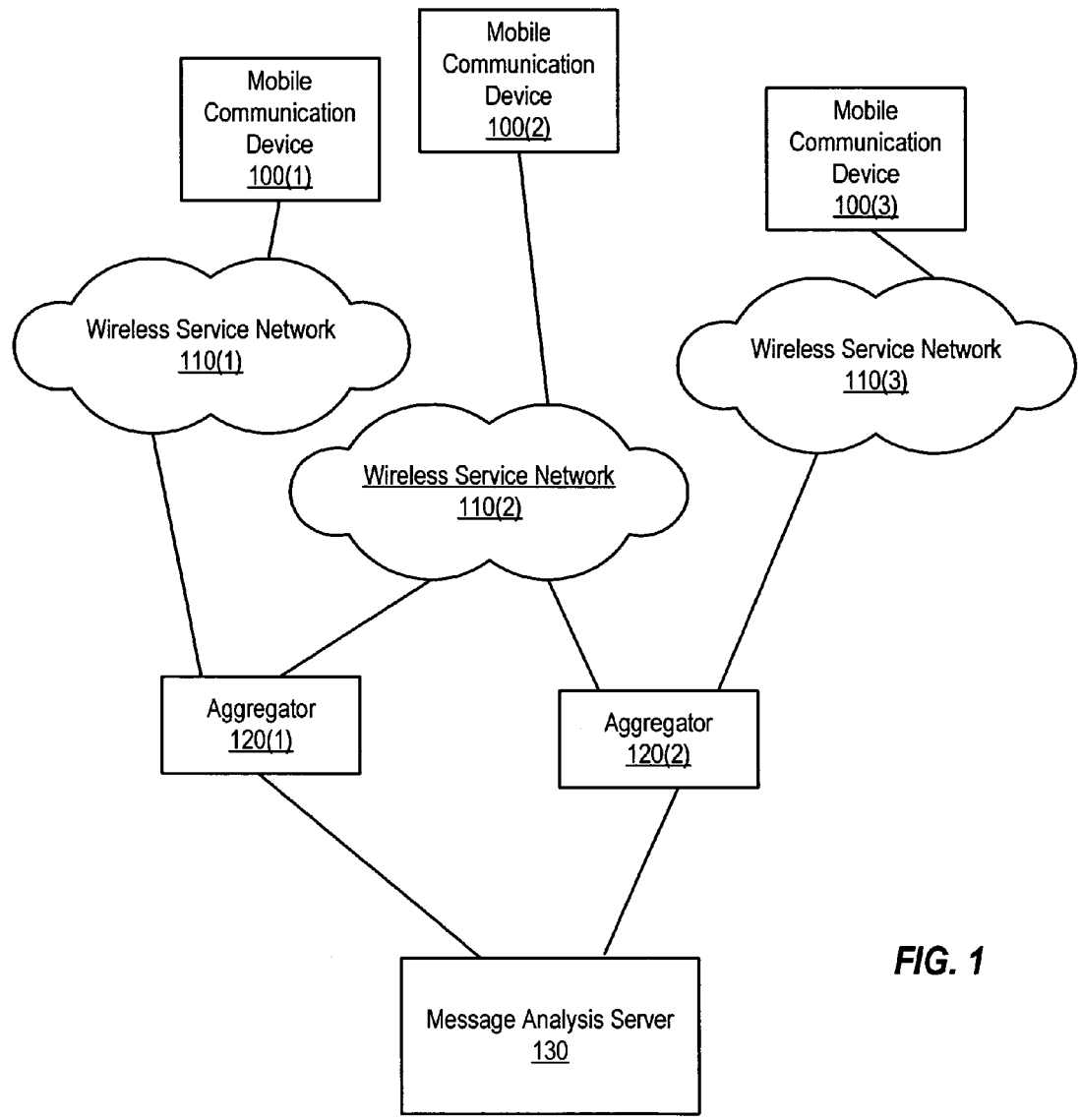
FIG. 1 is a block diagram of a mobile communications system that includes a message analysis server, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a mobile communications system that includes a message analysis server. As shown, the system includes several clients 100(1), 100(2), and 100(3), multiple wireless service networks 110(1), 110(2), and 110(3), several aggregators 120(1) and 120(2), and a message analysis server 130. While a particular number of each system component is shown in this example, it is noted that other embodiments may include different numbers of each component (e.g., an implementation may have hundreds of clients but only a single aggregator).

Each mobile communication device 100(1)-100(3) is a device such as a mobile or cell phone, a personal digital assistant (PDA), pager, or the like. Such mobile communications devices are portable and implement a mobile messaging protocol such as short messaging service (SMS), enhanced messaging service (EMS), or multimedia messaging service (MMS). Such protocols allow a user to send and receive messages that include a text component. Additional, each mobile communication device 100(1)-100(3) includes functionality for providing wireless telecommunications service, such as allowing a user to participate in wireless telephone calls.

Wireless networks 110(1)-110(3) are examples of wireless networks provided by different wireless service providers. Each wireless network can be provided by a different service provider. The wireless networks supports wireless telecommunications service as well as one or more mobile messaging protocols.

Typically, a user of a mobile communications device purchases service from a service provider in order to gain the ability to use the service provider's wireless network. In this example, the user of mobile communication device 100(1) has purchased service from the service provider that operates wireless network 110(1). Similarly, the users of mobile communication devices 100(2) and 100(3) have respectively purchased service from the service provides that operate wireless networks 110(2) and 110(3).

Aggregators 120(1)-120(2) provide connectivity from one or more service provider's wireless networks to a non-mobile application, such as message analysis server 130. As shown in this example, different aggregators may have different connectivity, and thus someone desiring to establish connectivity with multiple different wireless networks may need to purchase connectivity from more than one aggregator. In this example, aggregator 120(1) has connectivity to wireless service networks 110(1) and 110(2), while aggregator 120(2) has connectivity to wireless service networks 110(2) and 110(3).

Aggregators 120(1) and 120(2) route messages being sent to a telephone number associated with message analysis server 130 from wireless networks 110(1)-110(3) to message analysis server 130. In one embodiment, the aggregators use the Short Message Peer to Peer (SMPP) protocol or the MM7 protocol to send messages to message analysis server over a secured virtual private network (VPN) connection. It is noted that, in alternative embodiments where message analysis server 130 is able to directly communicate with the wireless service networks, aggregators 120(1) and 120(2) may be eliminated.

Message analysis server 130 is a non-mobile device that detects malicious code within messages. One or more telephone numbers can be associated with message analysis server 130, and any mobile messaging messages sent to those numbers will be provided to message analysis server 130 (via the appropriate wireless service network and/or aggregator). Message analysis server 130 will then analyze the contents of the message in order to detect whether any malicious code is present.

In some embodiments, message analysis server 130 simply collects suspicious message samples and stores the results of the analysis performed on such samples. In these embodiments, message analysis server 130 can be used to identify new malicious code threats (e.g., new viruses) and to track the spread of existing threats. The message samples and analysis collected by message analysis server 130 can be used to develop a response to the threats presented by the malicious code within the samples. In such an embodiment, one telephone number associated with message analysis server 130 can be publicized as a number to which mobile communications device users can send suspicious messages for analysis. Additionally, one or more non-publicized numbers can also be associated with message analysis server 130. These non-publicized numbers can be selected within blocks of numbers that are likely to be targeted by malicious code.

In other embodiments, in addition to collecting messages, message analysis server 130 can also respond to the sender with another message that indicates whether the analyzed message contained any malicious code. In this example, the phone number associated with message analysis server 130 can be publicized as a number to which users can submit messages in order to find out if those messages contain malicious code. In addition to notifying users as to whether a message contains malicious code, message analysis server 130 can also provide users with instructions and/or executables for removing malicious code.

In additional embodiments, message analysis server 130 both collects messages (e.g., sent to a first telephone number associated with a collection service) and performs analysis of messages for customers (e.g., for those messages sent to a telephone number associated with an analysis service). In such embodiments, message analysis server 130 can differentiate between the type of service to provide based upon the telephone number to which the message was sent.

In some embodiments, some or all of the telephone number(s) associated with message analysis server 130 are short code numbers. Short codes are shortened telephone numbers that contain fewer than the standard 10 digits. Typically, short codes are five to eight digits in length. SMS, EMS, and MMS messages can be sent to a short code. The short codes can be common short code (CSC) numbers that are recognized by more than one wireless service provider. CSCs can be registered with multiple different service providers, such that more than one wireless network can support a given CSC.

Alternatively, instead of being associated with short code(s), message analysis server 130 can be associated with standard telephone numbers. As with short codes, more than one standard telephone number can be associated with message analysis server 130. Additionally, both a short code and a standard telephone number can be associated with message analysis server 130.

Message analysis server 130 can use standard techniques for searching for malicious code within messages, such as searching for signatures indicative of viruses or other malicious code within the message and/or performing virtualized execution of code within an isolated computing environment to detect the presence of malicious code. A message can include more than one file (e.g., with MMS, messages can include images, executables, and the like), and thus message analysis server 130 may scan more than one file within the message for signatures.

Thus, messages can be sent (e.g., from one of mobile communication devices 100(1)-100(3)) to message analysis server 130, and message analysis server 130 will analyze that message for malicious code. Messages can be sent manually (e.g., a user can forward a suspicious message to the telephone number associated with message analysis server 130) or automatically. In the latter situation, an application (e.g., an antivirus program) executing on the mobile communication device can send the message to message analysis server 130. For example, in response to analyzing a message received by mobile communication device 100(1), an antivirus program executing on mobile communication device 100(1) can identify the message as containing suspicious content and forward the message to message analysis server 130 for more in-depth analysis. In some embodiments, the antivirus program will prompt the user for authorization prior to forwarding the message to message analysis server 130. Any response received from message analysis server 130 can either be directly provided to a user or provided to an application executing on the user's mobile communication device.

Accordingly, message analysis server 130 can provide users with a mechanism for detecting malicious code within mobile messaging protocol messages, even if the users do not have any antivirus protection on their mobile devices. Similarly, scaled-down antivirus protection implemented locally on a mobile communication device can forward a message to message analysis server 130 for full-scale analysis.

While the embodiment of FIG. 1 illustrates a scenario in which message analysis server 130 receives messages via aggregators 120(1) and 120(2), other scenarios are possible. For example, in one embodiment, message analysis server 130 can include or be coupled to one or more cellular modems that interface directly to a service provider's wireless service network. Each cellular modem interacts with the service provider's wireless service network in the same manner as a client (e.g., such as a mobile communications device) of the service provider. In this situation, suspicious messages are sent to the telephone number associated with the cellular modem, and the cellular modem then conveys the messages to message analysis server 130. In the case in which a cellular modem is used to convey traffic from a wireless service network to the message analysis server, the message analysis server is associated with a given telephone number by virtue of including and/or being connected to the cellular modem to which that telephone number is assigned.

Additionally, while the above example of FIG. 1 described a situation in which mobile messaging protocols are used to convey messages from mobile communication devices 100(1)-100(3) to message analysis server 130, other embodiments can use other techniques to convey suspicious messages between a mobile communications device and message analysis server 130. For example, in some embodiments, communication can employ User Datagram Protocol (UDP) over an Internet Protocol (IP) network. In this scenario, each user that desires to send suspicious messages to message analysis server 130 can install a special UDP-compatible client application on the user's mobile communications device. This client application can then be used to communicate with message analysis server 130. This client application can both send and receive messages from message analysis server 130. In this embodiment, instead of sending messages to a telephone number associated with message analysis server 130, the mobile communications devices send messages to an IP address associated with message analysis server 130.

In still other embodiments, mobile communication devices 100(1)-100(3) can communicate with message analysis server via Bluetooth™. In such an embodiment, the operator of message analysis server 130 could install gateway devices that support Bluetooth™ in one or more locations (e.g., train or subway stations and/or cars, airports, office buildings, restaurants, and the like). Bluetooth-enabled mobile communications devices in such a location can then communicate with the gateway device via a Bluetooth™ connection. Once connected to the gateway, the mobile communications devices could use the OBject EXchange (OBEX) protocol to transfer suspicious messages to the gateway, which would forward the messages to message analysis server 130. The gateway can also forward messages from message analysis server 130 to mobile communications devices. In this embodiment, instead of sending messages to a telephone number associated with message analysis server 130, the mobile communications devices send messages to a device identifier associated with message analysis server 130.

Figure 2:
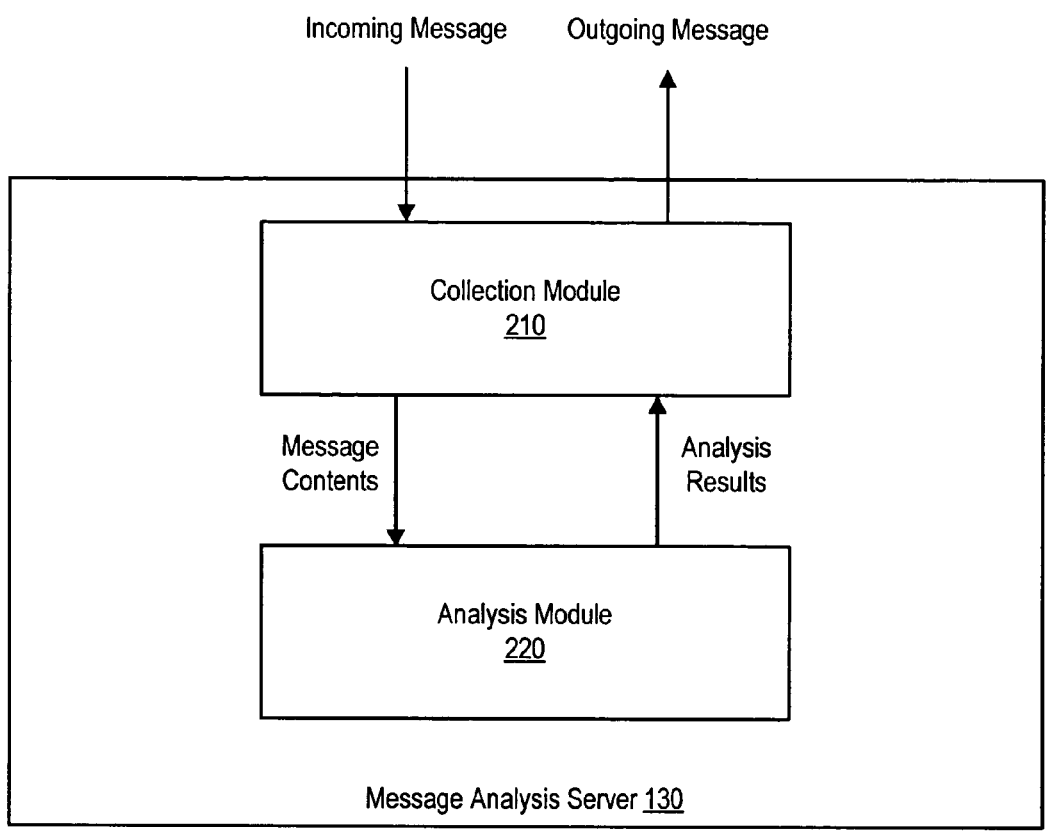
FIG. 2 is a block diagram of a message analysis server, according to one embodiment of the present invention.

FIG. 2 is a block diagram of a message analysis server. As shown, message analysis server 130 includes a collection module 210 and an analysis module 220. Incoming messages (e.g., received either directly from a connection, such as a cellular modem, to a wireless service network or via an aggregator) that are sent to message analysis server 130 are received by collection module 210. Collection module 210 obtains information about the message, such as the phone number, device identifier, and/or IP address of the sender. Collection module 210 can also obtain other information, such as the time at which the message was sent and/or received as well as which wireless service network was used to convey the message.

In certain situations, messages can include additional information identifying, for example, the operating system in use on the sending mobile device. For example, users can be instructed to include a code or text identifying their operating system in messages sent to message analysis server 130. If messages are sent by an antivirus program, the antivirus program can include this information in each message. If this additional information is present, collection module 210 will also collect the additional information.

Collection module 210 then provides the message contents to analysis module 220. The message contents can include a text message as well as other files (e.g., graphics files, audio or video files, executables, and the like) that are attachments to or otherwise included within the message. In some embodiments, collection module 210 can also provide additional information (such as the identity of the operating system in use on the sending device) to analysis module 220.

Analysis module 220 analyzes the message contents in order to determine whether the message contains any malicious code. For example, analysis module 220 can compare all or part of the message contents to a library of known virus signatures. Alternatively (or additionally), analysis module 220 can use virtualized execution techniques to detect the presence of any malicious code. Analysis module 220 can also analyze the message contents in order to detect suspicious patterns. Based on the outcome of the analysis, analysis module 220 identifies whether the message contains malicious code. Analysis module 220 provides the results of the analysis to collection module 210.

If message analysis server 130 is providing a collection service, collection module 210 stores the message, the analysis results, and any other desired information (e.g., the operating system of the sending device, the sender's telephone number, and the like). This stored information can later be analyzed to identify new threats, how existing threats are spreading, and so on.

If message analysis server 130 is providing an analysis service to users, collection module 210 will generate an outgoing message that contains the collection results. Collection module 210 will send this outgoing message to the mobile communication device (e.g., using the telephone number, device identifier, or IP address of that mobile communication device) that initially sent the message to message analysis server 130. The outgoing message will contain information indicating whether the original message contained any malicious code.

In some embodiments, in addition to notifying a user that a message contains malicious code, message analysis server 130 also provides a tool for removing the malicious code. In one embodiment, after identifying malicious code within a message, analysis module 20 generates a set of instructions that a user can follow to manually remove the malicious code. Analysis module 20 provides these instructions to collection module 210 as part of the analysis results.

In other embodiments, message analysis server 130 generates an executable that a user (or antivirus program executing on the user's mobile communication device) can execute in order to automatically remove the malicious code. In such an embodiment, analysis module 220 can generate a binary that includes a standard or core removal engine as well as dynamically generated removal functionality. For example, analysis module 220 can generate additional program instructions that are specific to a detected virus and/or to a particular operating system being used.

In some embodiments, analysis module 220 selectively determines whether to send instructions and/or an executable to a user or to simply alert the user based upon the information collected by collection module 210. For example, if a user did not provide any information about the user's operating system, analysis module 220 can select to simply return an alert. If the user provided operating system information but the mobile messaging protocol (e.g., SMS) being used does not support executables, analysis module 220 can generate instructions for manually removing the malicious code. If the user provided operating system information and the mobile messaging protocol (e.g., MMS) does support the inclusion of executables within messages, analysis module 220 can generate an executable for removing the malicious code.

Figure 3:
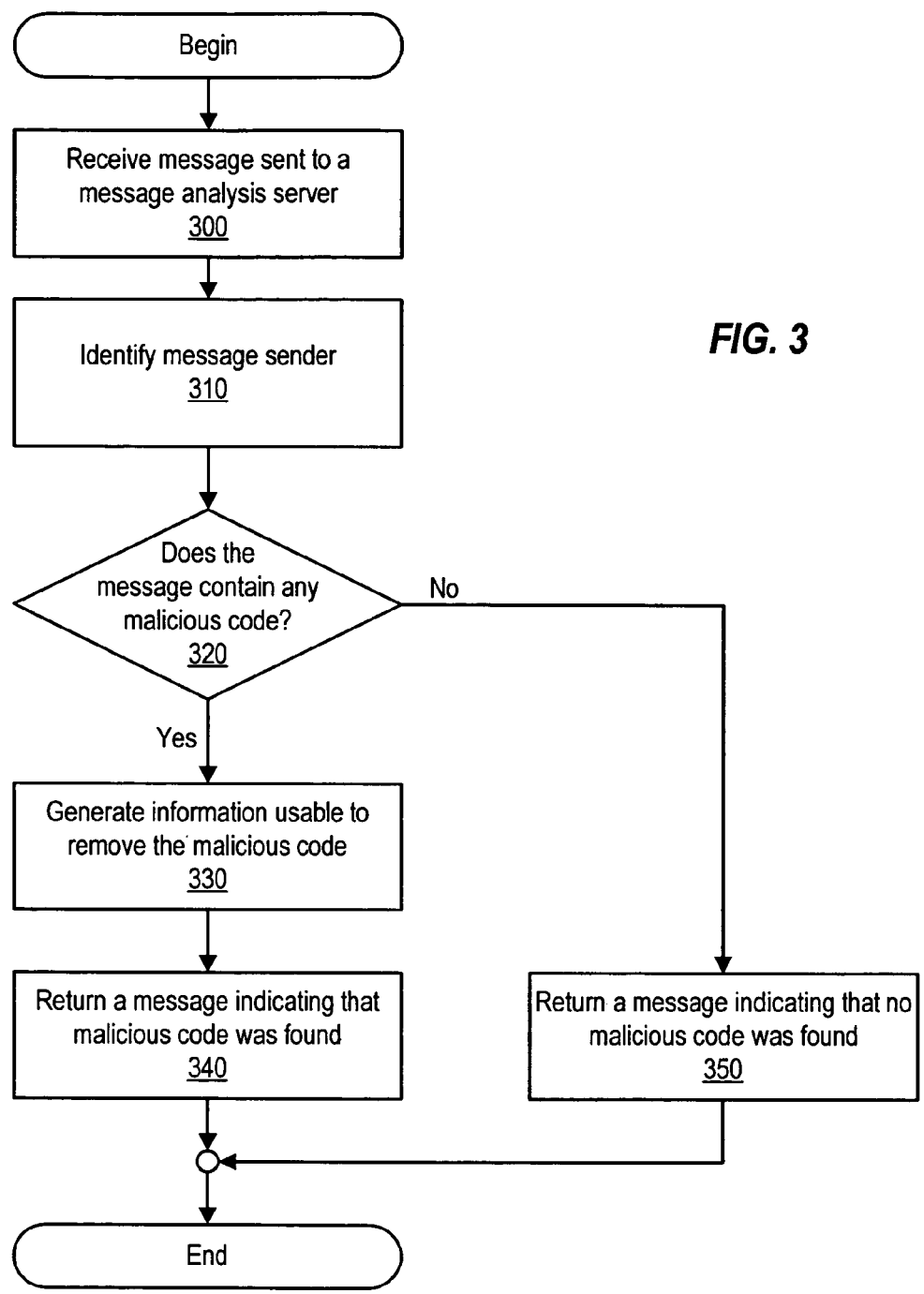
FIG. 3 is flowchart of a method of analyzing a mobile message, according to one embodiment of the present invention.

FIG. 3 is flowchart of a method of analyzing a mobile message. This method can be performed by a message analysis server such as the one illustrated in FIGS. 1 and 2. The method begins at 300, when a mobile messaging protocol message is received. In some embodiments, the message is sent to a telephone number associated with the message analysis server. As noted above, the telephone number can be a short code. The message can be sent to the message analysis server by a mobile communications device.

The message sender is identified (e.g., by telephone number, device identifier, or IP address), as shown at 310. Additional information about the sender and/or the message can also be obtained. For example, the wireless service network and/or mobile messaging protocol used to send the message can be identified.

At 320, the message is analyzed to determine whether the message contains any malicious code. If the message does not contain malicious code, and if the message analysis server is providing an analysis service (as opposed to merely a collection service), a message is returned to the user indicating that no malicious code was found, as shown at 350. If the message analysis server is simply providing a collection service, the analysis results may be saved or (since the analysis was negative) discarded.

If the message contains malicious code, information (e.g., an executable or a set of manual instructions) usable to remove the malicious code can optionally be generated, as shown at 330. The type of information (if any) to be generated can be determined based upon factors such as the type of mobile messaging protocol used to send the message and the operating system used by the sender. If, for example, no information about the sender's operating system is provided, the message analysis server can select to simply omit operation 330. Alternatively, the message analysis server can send the user a message, indicating that malicious code was found within the message and inquiring as to whether the user would like to receive information usable to remove the malicious code. The inquiry can specify that operating system or other needed information should be provided in the response.

If the message analysis server is providing an analysis service to users (as opposed to providing just a collection service), the message analysis server can return a message to the sender indicating that malicious code has been found, as shown at 340. If information was generated at 340, this information is also included in the message returned at 340. If the message analysis server is not providing an analysis service, the message analysis server can simply store the results of the analysis along with the original message received at 300.

Figure 4:
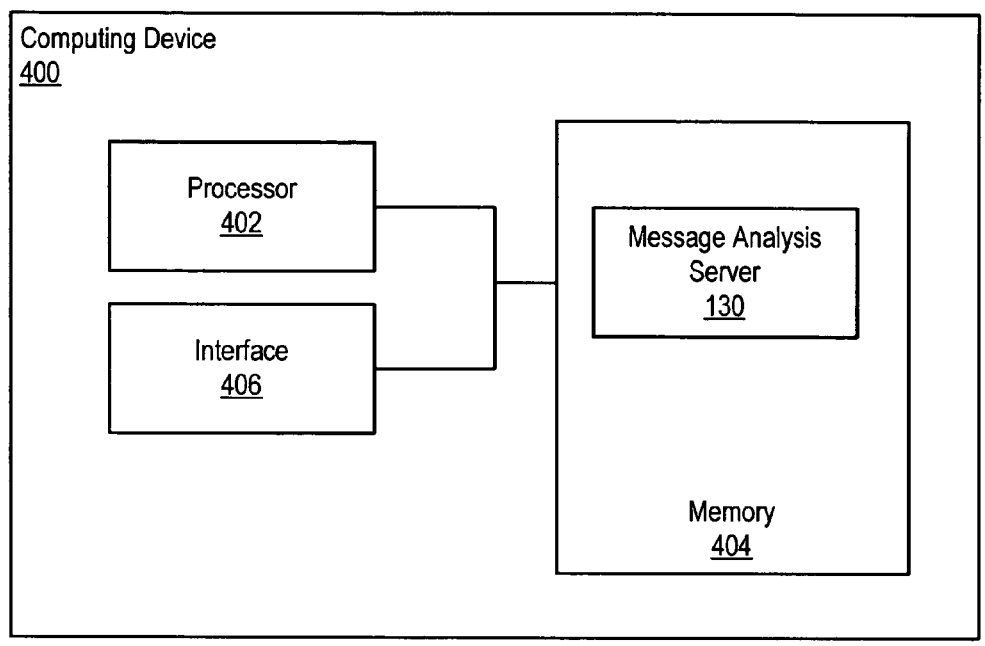
FIG. 4 is block diagram of a computer system that implements a message analysis server, according to one embodiment of the present invention.

FIG. 4 is block diagram of a computer system that implements a message analysis server, according to one embodiment of the present invention. FIG. 4 illustrates an example of the manner in which message analysis server 130 can be implemented in software.

FIG. 4 is a block diagram of a computing device 400. Computing device 400 can be a server computer, network switch, personal computer, laptop, or the like. As illustrated, computing device 400 includes one or more processors 402 (e.g., microprocessors, PLDs (Programmable Logic Devices), or ASICs (Application Specific Integrated Circuits)) configured to execute program instructions stored in memory 404. Memory 404 can include various types of RAM (Random Access Memory), ROM (Read Only Memory), Flash memory, MEMS (Micro Electro-Mechanical Systems) memory, magnetic core memory, and the like. Memory 404 can include both volatile and non-volatile memory.

Computing device 400 also includes one or more interfaces 406. Processor 402, interface 406, and memory 404 are coupled to send and receive data and control signals by a bus or other interconnect. Interface 406 can include a network interface to various networks (e.g., such as a network coupling computing device 400 to an aggregator) and/or interfaces to various peripheral devices, such as a cellular modem. Interface 406 can also include an interface to one or more storage devices.

In this example, program instructions and data executable to implement all or part of message analysis server 130 are stored in memory 404. The program instructions and data implementing message analysis server 130 can be stored on various computer readable media such as memory 404. In some embodiments, such software is stored on a computer readable medium such as a CD (Compact Disc), DVD (Digital Versatile Disc), hard disk, optical disk, tape device, floppy disk, and the like). In order to be executed by processor 402, the instructions and data can be loaded into memory 404 from the other computer readable medium. The instructions and/or data can also be transferred to computing device 400 for storage in memory 404 via a network such as the Internet or upon a carrier medium.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving a first message sent by a sender, wherein
      the first message is sent using a wireless messaging service, and
      the first message is received by a message analysis server;
   determining which of a plurality of telephone numbers to which the first message was sent, wherein
      the plurality of telephone numbers are associated with the message analysis server; and
   determining whether the first message comprises malicious code and selectively storing the first message and a result of such determining whether the first message comprises malicious code, based upon whether the message was sent to a particular one of the plurality of telephone numbers, wherein the selective storing is performed by the message analysis server.

2. The method of claim 1, further comprising:
   sending a second message to the sender, wherein the second message identifies whether the first message comprises malicious code.

3. The method of claim 2, wherein
   the first message further comprises information identifying an operating system of a mobile communication device associated with the sender, and
   a type of the second message is selected from a plurality of types of reply messages based on the information.

4. The method of claim 2, wherein the second message is a multimedia messaging system (MMS) message.

5. The method of claim 2, wherein the second message comprises instructions for manually removing the malicious code.

6. The method of claim 2, wherein
   the second message comprises an executable file, and
   the executable file is configured to remove the malicious code.

7. The method of claim 1, wherein the telephone number is a common short code.

8. The method of claim 1, wherein
the sender is an antivirus program executing on a mobile communication device.

9. The method of claim 1, wherein the first message comprises a file.

10. A system comprising:
a memory;
a processor coupled to the memory, wherein the memory stores instructions executable by the processor to implement at least a portion of a message analysis server; and
the message analysis server comprising:
a collection module configured to receive a message from a sender via a wireless messaging protocol, wherein the message is conveyed to the collection module by a messaging service interface, wherein the collection module is further configured to determine which of a plurality of telephone numbers to which the message was sent, wherein the plurality of telephone numbers are associated with the message analysis server, and
an analysis module coupled to the collection module, wherein the analysis module is configured to detect whether the message comprises malicious code and to selectively store a copy of the message and a result of such detecting, based upon whether the message was sent to a particular one of the plurality of telephone numbers.

11. The system of claim 10, further comprising:
a mobile communications device, wherein the mobile communications device is the sender.

12. The system of claim 10, wherein
the collection module is configured to send a second message to the sender, and
the second message identifies whether the message contained malicious code.

13. The system of claim 12, wherein
the analysis module is configured to generate a file containing instructions for manually removing the malicious code, and
the second message comprises the file.

14. The system of claim 12, wherein
the analysis module is configured to generate an executable file configured to remove the malicious code, and
the second message comprises the executable file.

15. A system comprising:
computer readable storage means for storing data;
means for receiving a first message sent by a sender, wherein the first message is sent using a wireless messaging service, and wherein the first message is received by a message analysis server;
means for determining which of a plurality of telephone numbers to which the first message was sent, wherein the plurality of telephone numbers are associated with the message analysis server;
means for determining whether the first message comprises malicious code; and
means for initiating storage of the first message and a result of determining whether the first message comprises malicious code in the computer readable storage means, based on whether the first message was sent to a particular telephone number of the plurality of telephone numbers.

16. The system of claim 15, further comprising:
means for sending a second message to the sender, wherein the second message identifies whether the message comprises malicious code.

17. A non-transitory computer readable medium comprising program instructions executable to:
detect a first message sent by a sender, wherein
the first message is sent using a wireless messaging service, and
wherein the first message is received by a message analysis server;
determine which of a plurality of telephone numbers to which the first message was sent, wherein
the plurality of telephone numbers are associated with the message analysis server; and
determine whether the first message comprises malicious code and selectively store the first message and a result that was determined from whether the first message comprises malicious code, based upon whether the message was sent to a particular one of the plurality of telephone numbers, wherein the first message is selectively stored by the message analysis server.

18. The non-transitory computer readable medium of claim 17, wherein the program instructions are further executable to:
send a second message to the sender, wherein the second message identifies whether the message comprises malicious code.

19. A method comprising:
receiving a first message on a message analysis server, wherein the first message is sent by a mobile communication device;
determining which of a plurality of telephone numbers to which the first message was sent, wherein the plurality of telephone numbers are associated with the message analysis server;
selectively storing a copy of the first message on the message analysis server, based on the determining;
determining whether the first message comprises malicious code; and
sending a second message to the mobile communication device, wherein the second message indicates whether the first message comprises malicious code.

20. The method of claim 19, wherein the first message is a multimedia messaging system (MMS) message.

21. The method of claim 19, wherein the second message comprises instructions for manually removing the malicious code.

22. The method of claim 19, wherein
the second message comprises an executable file, and
the executable file is configured to remove the malicious code.

23. The method of claim 19, wherein the first message is sent to a telephone number associated with the message analysis server.

24. The method of claim 23, wherein the telephone number is a common short code.

* * * * *

UNITED STATES PATENT AND TRADEMARK OFFICE
CERTIFICATE OF CORRECTION

| | | |
|---|---|---|
| PATENT NO. | : 8,090,393 B1 | Page 1 of 1 |
| APPLICATION NO. | : 11/479094 | |
| DATED | : January 3, 2012 | |
| INVENTOR(S) | : Oliver Whitehouse | |

It is certified that error appears in the above-identified patent and that said Letters Patent is hereby corrected as shown below:

In column 8, line 38, in Claim 1, delete "to" after "numbers" and insert -- to -- after "determining", therefor.

In column 8, line 39, in Claim 1, delete "which", therefor.

In column 9, line 19, in Claim 10, delete "to which" and insert -- to -- before "which of", therefor.

In column 9, line 53, in Claim 15, insert -- to -- after "determining", therefor.

In column 9, line 54, in Claim 15, delete "to which", therefor.

In column 10, line 15, in Claim 17, delete "to" after "numbers" and insert -- to -- after "determine", therefor.

In column 10, line 16, in Claim 17, delete "which", therefor.

In column 10, line 36, in Claim 19, delete "to" after "numbers" and insert -- to -- after "determining", therefor.

In column 10, line 37, in Claim 19, delete "which", therefor.

Signed and Sealed this
Twentieth Day of March, 2012

David J. Kappos
*Director of the United States Patent and Trademark Office*